United States Patent
Carrer et al.

(10) Patent No.: US 8,171,087 B2
(45) Date of Patent: May 1, 2012

(54) THREAD-BASED CONVERSATION MANAGEMENT

(75) Inventors: Marco Carrer, Reading, MA (US); David Mor, Merrimack, NH (US); Gopalan Arun, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1200 days.

(21) Appl. No.: 11/653,597

(22) Filed: Jan. 16, 2007

(65) Prior Publication Data

US 2008/0172462 A1    Jul. 17, 2008

(51) Int. Cl.
G06F 15/16    (2006.01)

(52) U.S. Cl. .................. 709/206; 709/205; 709/207

(58) Field of Classification Search .......... 709/205–207; 455/519, 556.2; 379/67.1, 88.17, 202.01
See application file for complete search history.

(56) References Cited

U.S. PATENT DOCUMENTS

| | | | |
|---|---|---|---|
| 6,212,548 B1 * | 4/2001 | DeSimone et al. ............ 709/204 |
| 6,484,196 B1 | 11/2002 | Maurille | |
| 6,912,564 B1 | 6/2005 | Appelman et al. | |
| 7,120,668 B2 | 10/2006 | Manber et al. | |
| 7,120,672 B1 | 10/2006 | Szeto et al. | |
| 7,124,123 B1 | 10/2006 | Roskind et al. | |
| 7,139,761 B2 | 11/2006 | McKibben et al. | |
| 7,206,813 B2 * | 4/2007 | Dunbar et al. ................ 709/206 |
| 7,363,344 B1 * | 4/2008 | Coletrane et al. ............ 709/206 |
| 7,426,192 B2 * | 9/2008 | Amano et al. ................ 370/261 |
| 7,568,007 B2 * | 7/2009 | Narayanaswami et al. ... 709/206 |
| 7,639,634 B2 * | 12/2009 | Shaffer et al. ................ 370/266 |
| 7,716,289 B2 * | 5/2010 | Malik ............................ 709/206 |
| 7,756,936 B2 * | 7/2010 | Rosenberg et al. ............ 709/206 |
| 7,818,375 B2 * | 10/2010 | Malik et al. ................... 709/206 |
| 7,970,840 B2 * | 6/2011 | Cannon et al. ................ 709/206 |
| 8,001,190 B2 * | 8/2011 | Bernstein et al. ............. 709/206 |
| 8,020,105 B1 * | 9/2011 | Lemay et al. ................. 715/746 |
| 2002/0172339 A1 | 11/2002 | Creswell et al. | |
| 2003/0212746 A1 * | 11/2003 | Fitzpatrick et al. ........... 709/206 |
| 2004/0078435 A1 * | 4/2004 | Dunbar et al. ................ 709/206 |
| 2004/0078444 A1 * | 4/2004 | Malik ........................... 709/206 |
| 2004/0078448 A1 | 4/2004 | Malik et al. | |
| 2004/0122810 A1 | 6/2004 | Mayer | |
| 2004/0186896 A1 | 9/2004 | Daniell et al. | |
| 2004/0254998 A1 * | 12/2004 | Horvitz ......................... 709/206 |
| 2005/0053214 A1 * | 3/2005 | Reding et al. ............ 379/202.01 |
| 2005/0071434 A1 * | 3/2005 | Hettish et al. ................. 709/207 |
| 2005/0080852 A1 | 4/2005 | Kelley et al. | |
| 2005/0132009 A1 * | 6/2005 | Solie ............................. 709/206 |
| 2005/0193074 A1 * | 9/2005 | Garland ........................ 709/206 |
| 2005/0267975 A1 | 12/2005 | Qureshi et al. | |
| 2006/0025164 A1 | 2/2006 | Wang et al. | |
| 2006/0026252 A1 | 2/2006 | Caspi et al. | |
| 2006/0031331 A1 * | 2/2006 | LoBuono et al. ............. 709/206 |
| 2006/0101119 A1 * | 5/2006 | Qureshi et al. ............... 709/206 |
| 2006/0123346 A1 * | 6/2006 | Totman et al. ............... 715/748 |
| 2006/0161853 A1 * | 7/2006 | Chen et al. ................... 715/758 |

(Continued)

*Primary Examiner* — Lisa Hashem (74) *Attorney, Agent, or Firm* — Kraguljac Law Group, LLC (57) ABSTRACT

Systems, methods, and other embodiments associated with thread-based conversation management are described. One system embodiment includes a conversation manager that provides access to communication applications, that provides lifecycle management for an electronic conversation carried on over the communication applications, and that organizes conversation elements belonging to a conversation carried on using the communication applications. The conversation lifecycle may include pausing and resuming a conversation carried on, at least in part, over a synchronous, online, real-time, communication application. The system embodiment may also include a thread manager to provide thread-based storage for conversation elements.

26 Claims, 8 Drawing Sheets

U.S. PATENT DOCUMENTS

| | | |
|---|---|---|
| 2006/0168026 A1 | 7/2006 | Keohane et al. |
| 2007/0038777 A1* | 2/2007 | Low et al. .................... 709/245 |
| 2007/0143423 A1* | 6/2007 | Kieselbach et al. .......... 709/206 |
| 2007/0288560 A1* | 12/2007 | Bou-Ghannam et al. ..... 709/204 |
| 2008/0059587 A1* | 3/2008 | Burtner et al. ................ 709/206 |
| 2008/0080677 A1* | 4/2008 | Samdadiya et al. .......... 379/67.1 |
| 2008/0080679 A1* | 4/2008 | Fernandez et al. ........ 379/88.17 |
| 2009/0006548 A1* | 1/2009 | Ramanathan et al. ........ 709/204 |
| 2009/0016512 A1* | 1/2009 | Bryant et al. ............ 379/202.01 |
| 2009/0119606 A1* | 5/2009 | Gilbert .......................... 715/758 |
| 2010/0011080 A1* | 1/2010 | Kordun .......................... 709/206 |
| 2010/0087172 A1* | 4/2010 | Klassen et al. ............. 455/412.1 |
| 2010/0162138 A1* | 6/2010 | Pascal et al. ................... 715/758 |
| 2010/0184512 A1* | 7/2010 | Evans et al. ..................... 463/31 |
| 2010/0191820 A1* | 7/2010 | Daniell et al. ................. 709/206 |
| 2010/0268534 A1* | 10/2010 | Kishan Thambiratnam et al. ............................. 704/235 |
| 2011/0047222 A1* | 2/2011 | Farrell et al. .................. 709/206 |
| 2011/0105160 A1* | 5/2011 | Tysowski ...................... 455/466 |
| 2011/0150198 A1* | 6/2011 | Walsh et al. ............. 379/202.01 |

* cited by examiner

THREAD-BASED CONVERSATION MANAGEMENT

BACKGROUND

Electronic conversations may take different forms including synchronous (e.g., instant messaging (IM), chat) and asynchronous (e.g., electronic mail (email)) forms. IM is a synchronous online collaboration technology that allows parties to communicate electronically with others singly and/or in groups. IM and other electronic messaging systems have recently come under security and auditing regulation scrutiny (e.g., Sarbanes-Oxley), which has found them wanting.

Figure 1:
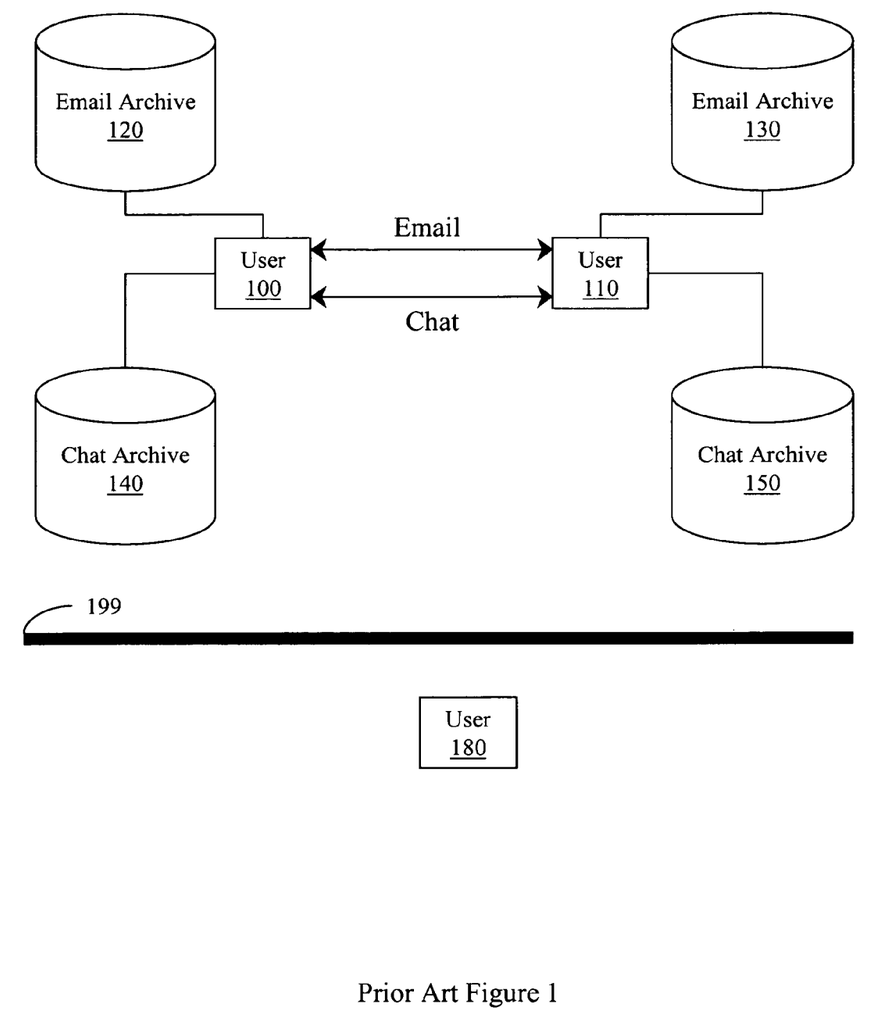
FIG. 1 illustrates how users may interact with conventional communication systems.

Consider Prior Art FIG. 1, which illustrates how users may interact with conventional systems. A user 100 and a user 110 may communicate using different applications (e.g., email, chat). Each user may have its own archive for each application. For example, user 100 may store emails in email archive 120 and may store chat messages in chat archive 140. Similarly, user 110 may store emails in email archive 130 and may store chat messages in chat archive 150. Whether messages are even stored may depend on a user choice. Conventionally, a user 180 would confront a digital divide 199 through which they could not penetrate to either view, share, or contribute to any conversations in which user 100 and user 110 engaged using the different applications.

Some systems have addressed integrating IM with email to facilitate mixing and matching between appropriate applications and/or modalities based on online availability. For example, both Yahoo and Google have integrated email and IM so that when a user starts an email communication, if the intended recipient(s) is online, the user is given the option of sending an IM instead of an email and vice versa. Some of these systems have even produced integrated archiving systems in an attempt to respond to security and auditing issues. However, the archive files are typically private text files organized by time and party.

Figure 2:
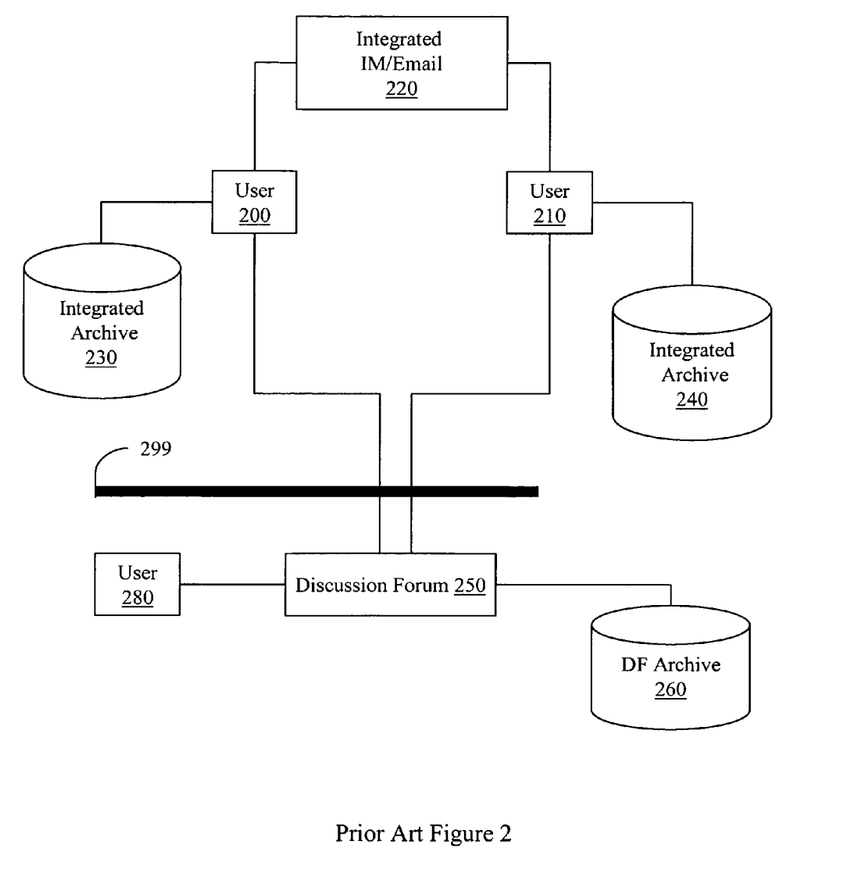
FIG. 2 illustrates how users may interact with a conventional integrated communication system and with a discussion forum.

Consider Prior Art FIG. 2, which illustrates how users may interact with a conventional integrated system. A user 200 and a user 210 may interact with an integrated system 220. Each user may have their own archive into which they may choose to store data. For example, user 200 may store messages from the integrated system 220 in archive 230 while user 210 may store messages from the integrated system 220 in archive 240. A user may interact with a discussion forum application 250 that has its own archive 260. However, user 280 remains on the wrong side of the digital divide 299, unable to view, share, or participate in conversations in which user 200 and user 210 participated using the integrated application 220. User 280 may have access to the discussion forum application 250 and through application 250 to its archive 260.

Regardless of their form, electronic conversations are started for some reason. Similarly, other actions that occur during the lifecycle of a conversation (e.g., pausing, resuming, ending) occur for a reason. The reason(s) why a conversation started, progressed as it did, and concluded may have some historical, institutional, and/or personal importance. Similarly, the exchange of ideas that occurred during the conversation may also have some importance. This importance may extend beyond just the conversation participants. However, conventional systems, to the extent that they have provided any archiving of conversations at all, have done so in an inefficient and/or limited temporal only approach. This is particularly the case for short term synchronous text conversation modalities (e.g., IM, chat). IM archives have typically been simple text files that are stored on a per user basis and that are difficult, if possible at all, to share, organize, arrange, and/or search. Even in integrated systems, IM/email archives have typically been personal and organized by party and/or date.

The limitations associated with conventional systems may be associated with how these types of conversations have historically been initiated, prosecuted, and concluded. In a typical flow, one online user noticed that another person with whom they would like to communicate was also online. A conversation was initiated, typically short text messages were exchanged in a synchronous manner, and eventually the conversation concluded. To the extent that any archiving occurred, each party may have chosen to dump text messages into a private text file. This text file was typically neither searchable nor shareable.

With the advent of integrated IM/email systems, an IM user may have wanted to communicate with another IM user, but that user may have been offline. Thus, the integrated system may have accepted an IM message from the original user but may have sent it as an email. Once again, archiving may have been a personal choice to dump to a personal repository that was typically not searchable and not shareable. In these integrated systems, relationships between IM messages and related emails may be maintained.

Conventional systems may have some metadata available for their private archives. For example, the date a conversation occurred, the party who stored the file, and the time the conversation started/ended may be available. This limited metadata supports only limited searching, which compromises the ability to pause and resume conversations, particularly across different modalities. Consider the following typical scenario, which illustrates limitations associated with conventional systems.

Two employees have a chat (e.g., IM) session on how to install a product. One employee is an expert from whom the other employee is seeking help. The expert provides advice and the non-expert starts to follow the advice. Later, when the non-expert has gone as far as possible with the available information, the non-expert may try to acquire more information form the expert. However, the expert may not be online, and thus may be unavailable to immediately resume the conversation. Thus, the non-expert may send an email. The expert eventually receives the email. However, the email does not include the chat session conversation, so the expert may experience re-initiation costs like finding an archive of the chat session (if it even exists) and refreshing recollection of the subject matter and progress to date. The expert will then decide how to reply (e.g., email, chat). At some point after this second interaction, the non-expert may yet again seek further information, this time while the expert is available online. The new chat may also be out of context for the expert since other issues are likely to have arisen in the interim. Thus, either the non-expert or the expert will need to acquire archived information (if any) from two separate modalities (chat, email), organize it, and present it in a coherent manner to facilitate this third communication in the conversation. The non-expert may finally resolve their issue and move on. The non-expert may identify the expert to another non-expert who is experiencing the same issue. This second non-expert may then initiate a conversation with the expert. Conventionally there is no simple, effective way for the expert to capture the knowledge of the previous mixed modality conversation and to provide the information to the second (and subsequent) non-expert. While the same topic may be discussed, different modalities employed in a multi-step conversation that was paused and resumed may frustrate recreating the topic and its resolution.

The situation may be exacerbated further if the expert sought out additional information from a colleague and provided that information to the non-expert as part of the first conversation. Since the additional information, if stored at all, would conventionally be stored as part of a separate conversation, it may be very difficult, if possible at all, to recreate that portion of the multi-party conversation.

BRIEF DESCRIPTION OF THE DRAWINGS

The accompanying drawings, which are incorporated in and constitute a part of the specification, illustrate various example systems, methods, and other embodiments of various aspects of the invention. It will be appreciated that the illustrated element boundaries (e.g., boxes, groups of boxes, or other shapes) in the figures represent one example of the boundaries. One of ordinary skill in the art will appreciate that in some embodiments one element may be designed as multiple elements, multiple elements may be designed as one element, an element shown as an internal component of another element may be implemented as an external component and vice versa, and so on. Furthermore, elements may not be drawn to scale.

Prior Art

Prior Art

DETAILED DESCRIPTION

Example systems and methods facilitate managing the lifecycle of conversations that employ various communication applications and that may occur over mixed and/or varying modalities between varying sets of participants who may, for example, start, contribute online, pause, contribute offline, resume, share, search, and terminate their conversations over various periods of time. The managing may include intelligent archiving, which facilitates topic based searching of archived conversations and related metadata. This intelligent searching facilitates pausing and resuming conversations. In one example, messages associated with a synchronous communication application (e.g., chat session, instant messaging (IM)) and/or an asynchronous communication application (e.g., email) can be reconciled and automatically stored in a shareable, searchable, archive using, for example, a thread-based approach like that associated with a discussion forum.

Example systems and methods may also process metadata that focuses on conversation meaning, rather than on the application through which a conversation flowed. This facilitates enhancing the ability to search and/or share conversations. For example, metadata concerning a conversation topic and a conversation context may be processed. This processing may include acquiring metadata from users and, in some examples, automatically extracting metadata from messages exchanged in a conversation. This metadata may also be stored using a thread-based approach like that associated with discussion forums.

In one example, a user may be presented with an interface through which the user may send and receive messages that appear to have a single consistent format (e.g., chat session, IM message, email message). However, messages processed through the interface may be handled by a conversation manager that employs a thread-based system (e.g., discussion forum) that includes intelligence for metadata extraction and/or preservation. The conversation manager may employ different modalities for different parties and/or at different points in time.

The thread-based approach to archiving conversations and to processing related conversation metadata facilitates managing the lifecycle of a conversation, and, in particular, pausing and resuming a conversation. In this manner, knowledge that may previously have been difficult, if possible at all, to retrieve and/or to share may now be captured and shared.

Recall the conversation between the non-expert and the expert. Now consider a third party (e.g., additional expert) who uses the conversation sharing provided by example systems and methods to view that conversation between the non-expert and the expert. The additional expert may decide to contribute to the conversation. In one example, the additional expert may add a message to the conversation by, for example, posting a message to a thread being used to archive the conversation. When the original parties resume or view their conversation, this off-line, third-party collaborative effort may be available to them to further their conversation.

Consider a different third party (e.g., manager) who uses the conversation sharing provided by example systems and methods to view a conversation between experts and non-experts. The manager may recognize the value of the conversation and thus may edit out superfluous material (e.g., greetings, sports discussions, weather comments), enhance certain material (e.g., question, answer), and otherwise manipulate (e.g., moderate) the stored conversation. In this way, knowledge associated with the conversation may be both retained and refined. With conventional per-party time-based archiving, these types of actions would be difficult, if possible at all, to perform.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer component", as used herein, refers to a computer-related entity (e.g., hardware, firmware, software, software in execution, combinations thereof). Computer components may include, for example, a process running on a processor, a processor, an object, an executable, a program, and a computer. A computer component(s) may reside within a process. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE-802.5), a local area network (LAN), a wide area network (WAN), a point-to-point system, a circuit switching system, a packet switching system, and so on.

"Data store", as used herein, refers to a physical and/or logical entity that can store data. A data store may be, for example, a database, a table, a file, a list, a queue, a heap, a memory, a register, a disk, and so on. In different examples a data store may reside in one logical and/or physical entity and/or may be distributed between multiple logical and/or physical entities.

"Logic", as used herein, includes but is not limited to hardware, firmware, software and/or combinations thereof to perform a function(s) or an action(s), and/or to cause a function or action from another logic, method, and/or system. Logic may include a software controlled microprocessor, discrete logic (e.g., application specific integrated circuit (ASIC)), an analog circuit, a digital circuit, a programmed logic device, a memory device containing instructions, and so on. Logic may include a gate(s), a combinations of gates, other circuit components, and so on. In some examples, logic may be fully embodied as software. Where multiple logical logics are described, it may be possible in some examples to incorporate the multiple logical logics into one physical logic. Similarly, where a single logical logic is described, it may be possible in some examples to distribute that single logical logic between multiple physical logics.

"Machine-readable medium", as used herein, refers to a medium that participates in directly or indirectly providing signals, instructions and/or data that can be read by a machine (e.g., computer). A machine-readable medium may take forms, including, but not limited to, non-volatile media (e.g., optical disk, magnetic disk), and volatile media (e.g., semiconductor memory, dynamic memory). Common forms of machine-readable mediums include floppy disks, hard disks, magnetic tapes, RAM (Random Access Memory), ROM (Read Only Memory), CD-ROM (Compact Disk ROM), and so on.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more computer instructions and/or processor instructions that can be read, interpreted, compiled, and/or executed by a computer and/or processor. Software causes a computer, processor, or other electronic device to perform functions, actions and/or behave in a desired manner. Software may be embodied in various forms including routines, algorithms, modules, methods, and/or programs. In different examples software may be embodied in separate applications and/or code from dynamically linked libraries. In different examples, software may be implemented in executable and/or loadable forms including, but not limited to, a stand-alone program, an object, a function (local and/or remote), a servelet, an applet, instructions stored in a memory, part of an operating system, and so on. In different examples, computer-readable and/or executable instructions may be located in one logic and/or distributed between multiple communicating, co-operating, and/or parallel processing logics and thus may be loaded and/or executed in serial, parallel, massively parallel and other manners.

"Thread" is used herein in the discussion-forum context manner. Thus, a thread refers to a set of related communication elements (e.g., messages, postings) through which it is possible to navigate based on data related to the communication elements.

"User", as used herein, includes but is not limited to, one or more persons, software, computers or other devices, or combinations of these.

Some portions of the detailed descriptions that follow are presented in terms of algorithm descriptions and representations of operations on electrical and/or magnetic signals capable of being stored, transferred, combined, compared, and otherwise manipulated in hardware. These are used by those skilled in the art to convey the substance of their work to others. An algorithm is here, and generally, conceived to be a sequence of operations that produce a result. The operations may include physical manipulations of physical quantities. The manipulations may produce a transitory physical change like that in an electromagnetic transmission signal.

It has proven convenient at times, principally for reasons of common usage, to refer to these electrical and/or magnetic signals as bits, values, elements, symbols, characters, terms, numbers, and so on. These and similar terms are associated with appropriate physical quantities and are merely convenient labels applied to these quantities. Unless specifically stated otherwise, it is appreciated that throughout the description, terms including processing, computing, calculating, determining, displaying, automatically performing an action, and so on, refer to actions and processes of a computer system, logic, processor, or similar electronic device that manipulates and transforms data represented as physical (electric, electronic, magnetic) quantities.

Figure 3:
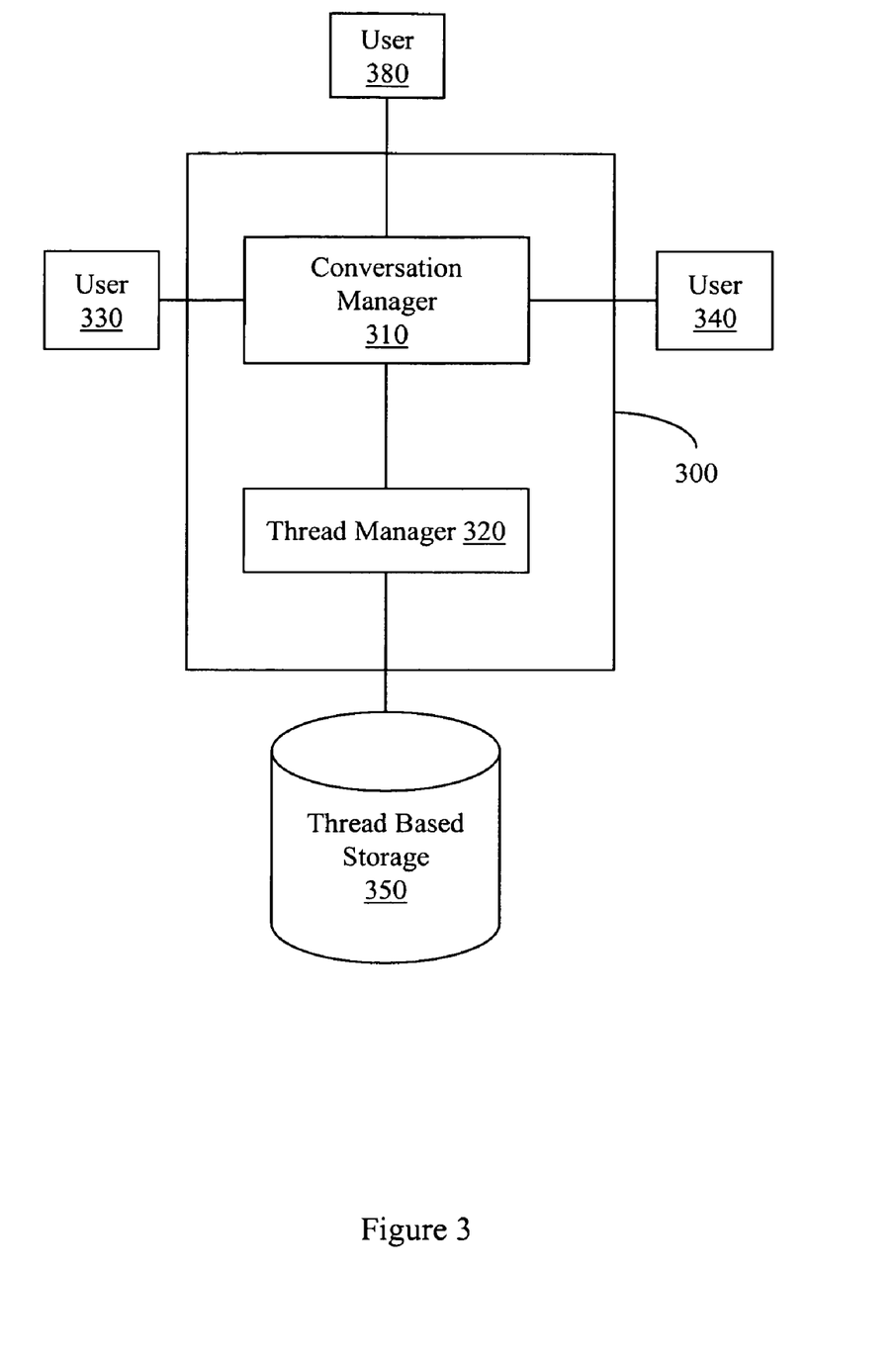
FIG. 3 illustrates an example system associated with thread-based conversation management.

FIG. 3 illustrates a system 300 associated with thread-based conversation management. System 300 may include a conversation manager 310 that facilitates conversations between users 330 and 340. Unlike conventional systems, system 300 may make conversation data visible and accessible to other users (e.g., user 380).

Conversation manager 310 may be, for example, a logic. Conversation manager 310 may provide access to communication applications. The communication applications will include at least a synchronous, online, real-time, communication application (e.g., chat, IM) and may, in some examples, include an asynchronous communication application.

Conversation manager 310 may provide lifecycle management for a conversation that is carried on, at least partially, using the synchronous, online, real-time, communication application. As mentioned above, the conversation may be between a user 330 and a user 340. In one example, the conversation may be a multi-party conversation that may include user 380 and/or other users. In one example, lifecycle management will include pausing and resuming a conversation. In another example, lifecycle management will include conversation initiation, conversation termination, accepting online submissions, accepting offline submissions, and so on. An online submission may be made by an initial participant, by a subsequent participant, by a user who watches the conversation from the sidelines, and so on. Similarly, an offline submission may be made by original participants, subsequent participants, watchers, and so on.

As mentioned above, conversation manager 310 may provide lifecycle management that includes pausing and resuming a conversation. Resuming a conversation may include tasks that are facilitated by archiving the conversation and related metadata using a thread-based approach. Resuming a conversation may include re-establishing a conversation using the communication application with which it was originally conducted and/or a communication application other than that with which it was originally conducted. Additionally, resuming a conversation may include re-establishing a conversation between the set of participants who originally participated and/or between a set of participants different than those who originally participated. Figuring out who to include in a conversation and where to pick up the conversation is facilitated by navigating the thread-based conversation elements and/or conversation metadata. Instead of searching individual text files that may or may not be shareable, example systems can use discussion forum-like search tools to locate relevant data, relevant persons, relevant issues, and so on.

System 300 may include a thread manager 320. Thread manager 320 may organize conversation elements in thread-based storage 350. Thread-based storage 350 may be, for example, a data store. Using thread-based storage facilitates navigating through archived conversation elements using a sophisticated discussion forum approach. Thus, thread-based storage facilitates having the conversation management logic selectively provide a notification about the state of a conversation upon the occurrence of a lifecycle event. The notification may be, for example, a link to a conversation, a link to a conversation element, a link to a conversation summary, and so on. A link may be, for example, a URL, a GUID, a pointer, and so on. The notification may include information about participants, topics, submissions that occurred while a conversation was paused, and so on.

Figure 4:
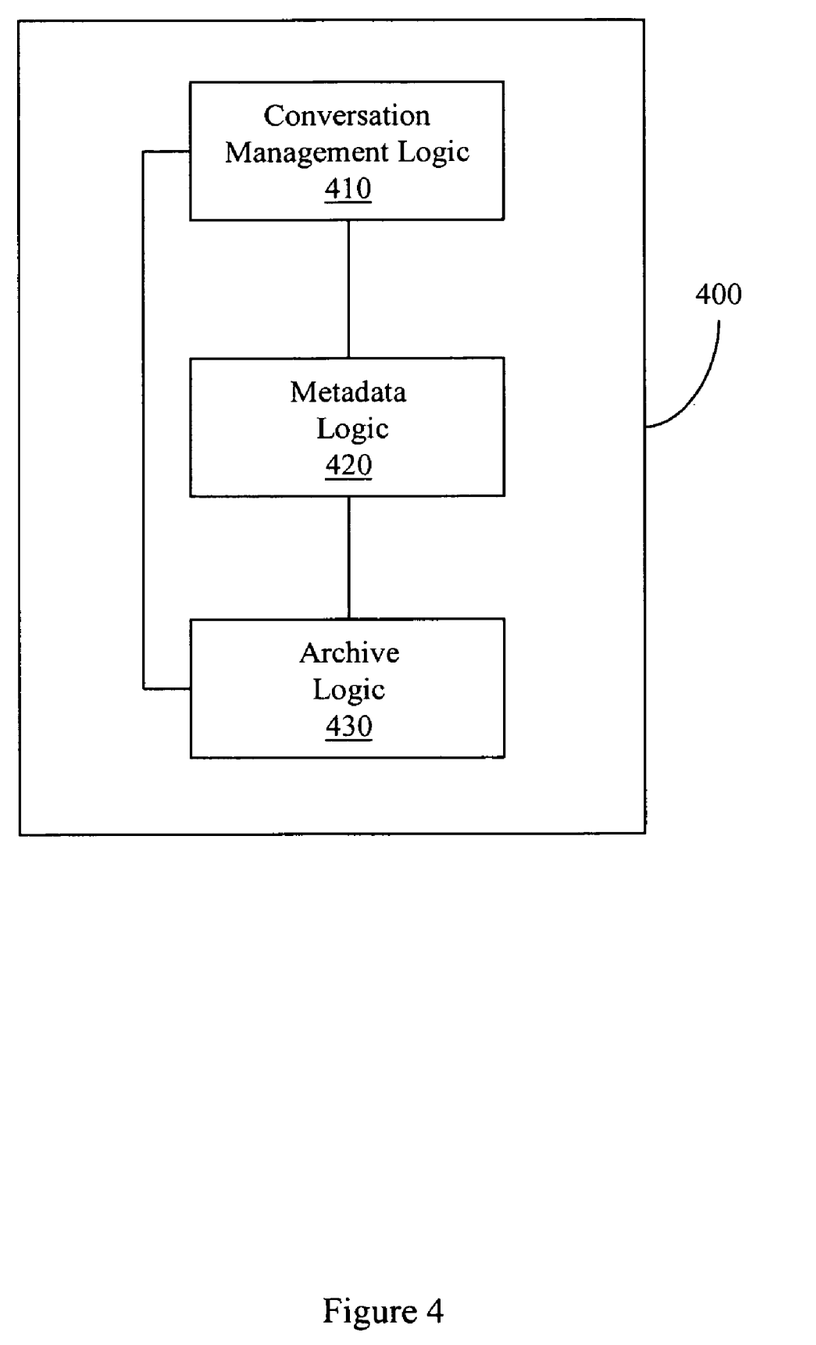
FIG. 4 illustrates an example conversation manager associated with thread-based conversation management.

FIG. 4 illustrates a conversation manager 400. Conversation manager 400 may include a conversation management logic 410. Conversation management logic 410 may provide lifecycle management for a conversation. As mentioned above, a conversation lifecycle may include conversation initiation, conversation termination, conversation pausing, conversation resuming, and so on. In one example, a conversation lifecycle may also include receiving third party submissions, receiving off-line submissions, integrating third party submissions into an archived conversation, and integrating off-line submissions into an archived stored conversation. These actions, particularly integrating third party submissions and off-line submissions into an archived stored conversation may include navigating through posts in a thread and inserting data at an appropriate location. Navigating through posts may include, for example, identifying a current conversation element and then moving forward or backward through other conversation elements until an appropriate location is identified. The location may be identified, for example, by metadata corresponding to temporal data, by metadata corresponding to corresponding party data, by metadata corresponding to a response chain, and so on.

Conversation manager 400 may also include a metadata logic 420 operably connected to conversation management logic 410. Metadata logic 420 may process metadata associated with a conversation. This metadata may include, for example, data corresponding to a topic, data corresponding to a context, data corresponding to a set of questions, data corresponding to a set of answers related to the set of questions, data corresponding to parties involved in a conversation, data corresponding to a conversation element most recently posted to a conversation, and so on. The context may include data corresponding to a communication application employed, a communication modality employed, a set of participants, and so on. The topic may have been identified by a user and/or may have been automatically generated by, for example, a topic logic.

In one example, metadata logic 420 may perform actions including, causing metadata to be added to an archive, filtering metadata, deleting metadata, and establishing relations between metadata elements. Adding metadata may include, for example, adding a value provided by a user, adding a value automatically acquired from a set of conversation elements, adding a value provided by a communication application, and so on. Deleting metadata may include, for example, removing metadata corresponding to deleted conversations, removing data corresponding to deleted conversation elements, and so on. Filtering metadata may include, for example, selectively providing a first view of metadata to a first user having a first security classification and selectively providing a second (e.g., more restricted) view of metadata to a second user have a second (e.g., less extensive) security classification. Establishing relations between metadata elements may include, for example, identifying sending and receiving parties, identifying original messages and responses thereto, and so on.

Conversation manager 400 may also include an archive logic 430 operably connected to the metadata logic 420 and the conversation management logic 410. Archive logic 430 may interface with, for example, a thread manager (e.g., thread manager 320 (FIG. 3)). In one example, using archive logic 430 to localize interactions with storage like that provided by thread manager 320 (FIG. 3) facilitates making conversation management logic 410 and/or metadata logic 420 extensible and storage system independent. Archive logic 430 may provide services including providing a conversation element to a thread manager, providing conversation metadata to a thread manager, providing access to a stored conversation element, providing access to stored conversation metadata, and so on. This access may be provided, for example, using an application programming interface (API) to which other logics may provide data and from which other logics may receive data.

One issue with conventional systems was the private nature of the individual archives of individual users. Such partitioned, closed systems frustrated attempts to include others in conversations, to make conversations shareable, to resume conversations using different applications, modalities, and/or participants, and so on. Thus, in one example, archive logic 430 may selectively provide access to archived conversation elements to parties other than original conversation participants. Similarly, archive logic 430 may selectively provide access to archived conversation metadata to parties other than original conversation participants.

Figure 5:
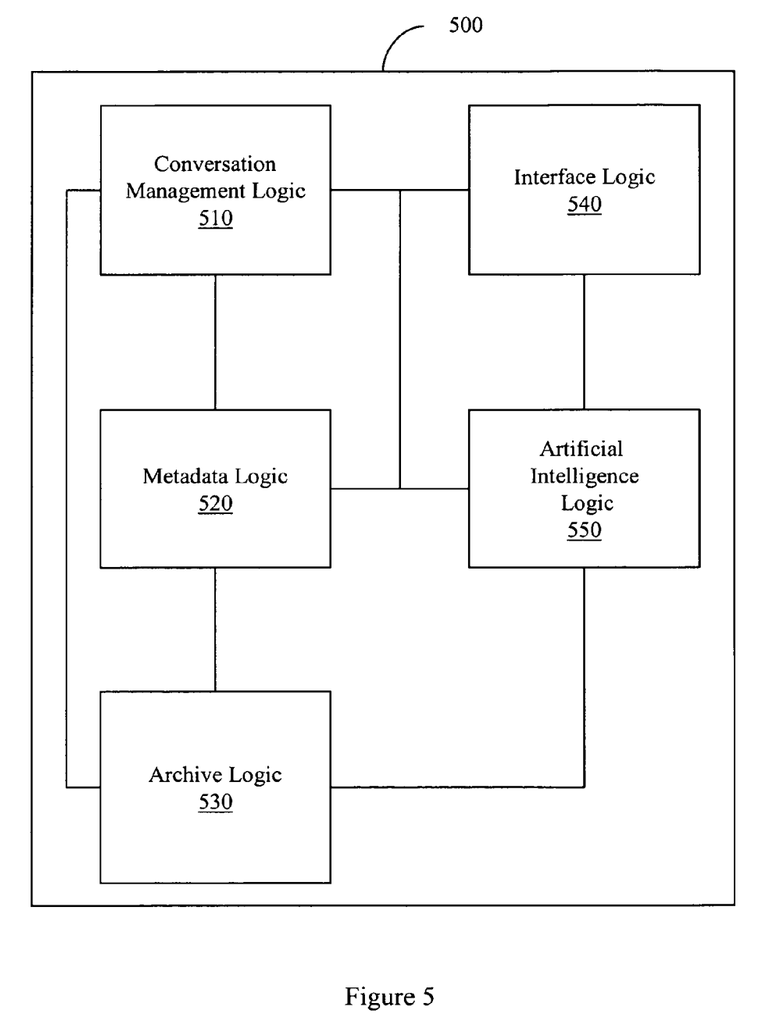
FIG. 5 illustrates an example conversation manager associated with thread-based conversation management.

FIG. 5 illustrates a conversation manager 500 that shares some elements with conversation manager 400 (FIG. 4). For example, conversation manager 500 includes a conversation management logic 510, a metadata logic 520, and an archive logic 530. However, conversation manager 500 also includes some additional elements.

For example, conversation manager 500 includes an interface logic 540. In one example, interface logic 540 may provide an interface that presents a conversation to a user as being implemented using a single communication modality regardless of the number of communication modalities and/or applications actually employed. For example, a user who selects a chat conversation may be presented with a chat user interface regardless of whether messages are being carried as chat messages, email messages, instant messenger messages, and so on. Thus, the user may carry on their conversation without being concerned about the actual underlying modality.

However, interface logic 540 may automatically provide a suggestion concerning a communication modality for the conversation based, at least in part, on the online status of a conversation participant(s). For example, if a user has selected a chat interface, and none of the intended participants are online, then the interface logic 540 may suggest an asynchronous offline modality instead. In another example, interface logic 540 may go even further. For example, interface logic 540 may automatically select a communication modality for a conversation. Like the suggestion, the selection may be based, at least in part, on the online status of a conversation participant(s).

Conversation manager 500 may also include an artificial intelligence logic 550. Artificial intelligence logic 550 may, for example, perform semantic analysis on conversation elements. This semantic analysis may facilitate, for example, extracting metadata, hypothesizing meaning, establishing summaries, and so on. As mentioned above, a notification may be generated upon the occurrence of certain lifecycle events. For example, when a conversation resumes, a party to the conversation may be notified of the resumption and may be provided with a summary of the conversation to date. This may improve the experience of, for example, the expert having the running on-again off-again conversation with the non-expert described above.

A summary may have different forms. For example, a summary may include a first conversation element and/or a last conversation element. This may facilitate navigating forward and/or backward in a conversation to a desired resumption point. In another example, a summary may include a set of conversation elements from the beginning of a conversation and/or a set of conversation elements from the end of a conversation. In addition to the start and end of a conversation, a set of conversation elements bracketing the entry and/or exit of a party may be provided. This may facilitate resuming a conversation for a particular user who may only be interested in a particular portion of a lengthy conversation. In another example, a summary may include a set of questions and a set of answers related to the set of questions.

Example methods may be better appreciated with reference to flow diagrams. While for purposes of simplicity of explanation, the illustrated methods are shown and described as a series of blocks, it is to be appreciated that the methods are not limited by the order of the blocks, as in different embodiments some blocks may occur in different orders and/or concurrently with other blocks from that shown and described. Moreover, less than all the illustrated blocks may be required to implement an example method. In some examples, blocks may be combined, separated into multiple components, may employ additional, not illustrated blocks, and so on. In some examples, blocks may be implemented in logic. In other examples, processing blocks may represent functions and/or actions performed by functionally equivalent circuits (e.g., an analog circuit, a digital signal processor circuit, an application specific integrated circuit (ASIC)), or other logic device. Blocks may represent executable instructions that cause a computer, processor, and/or logic device to respond, to perform an action(s), to change states, and/or to make decisions. While the figures illustrate various actions occurring in serial, it is to be appreciated that in some examples various actions could occur concurrently, substantially in parallel, and/or at substantially different points in time.

Methods may be implemented as processor executable instructions. Thus, a machine-readable medium may store processor executable instructions that if executed by a machine (e.g., processor) cause the machine to perform a method. Example methods 600 and 700 are examples of methods that the machine may be caused to perform.

Figure 6:
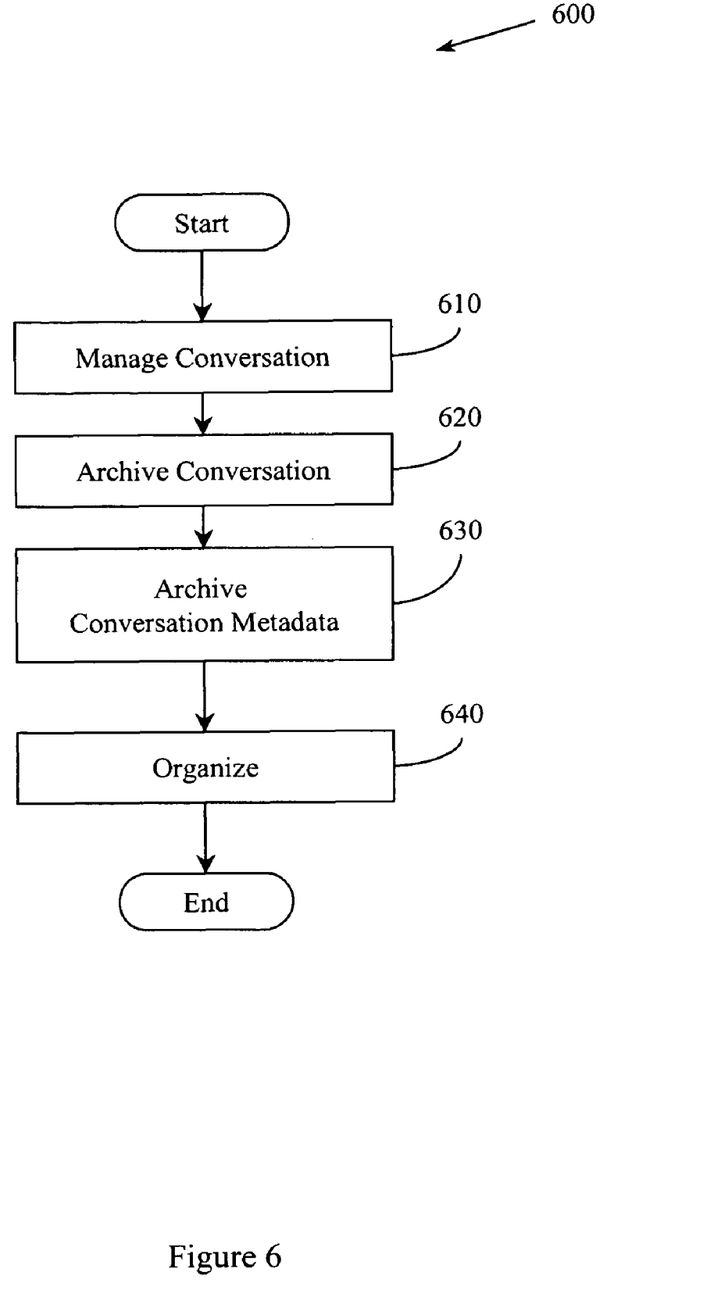
FIG. 6 illustrates an example method associated with thread-based conversation management.

FIG. 6 illustrates a method 600. Method 600 may include, at 610, managing a conversation having a lifecycle. The lifecycle may include, for example, starting, pausing, resuming, terminating, accepting on-line contributions, accepting off-line contributions, accepting contributions from third parties, and so on. Over its lifespan, the conversation may be carried on, at least in part, over a synchronous, online, real-time communication modality (e.g., chat, IM).

In one example, resuming a conversation may include a set of activities. The set may include resuming a conversation using an original communication modality and/or resuming a conversation using a communication modality different from an original communication modality. For example, a conversation may have initially been a synchronous, online, real-time event. However the initial conversation may have been paused. When the conversation is resumed, it may be resumed as an asynchronous event. The set may also include resuming a conversation using two or more communication modalities. For example, some participants may be available online in real-time and others may not. Thus, a first modality (e.g., chat) may be used for a first set of participants while a second modality (e.g., email) may be used for a second set of participants. The set may also include resuming a conversation with an original set of participants and/or with a set of participants different from the original set of participants. For example, a first conversation may occur between a first non-expert and a first expert. A second conversation may then occur between a second non-expert and the first expert. To the second non-expert this appears as a new conversation. To the first expert, it appears as a repetition of a previous conversation. Thus, the expert may attempt to resume a conversation at a useful point but with a different participant.

Method 600 may also include, at 620, archiving a conversation as a thread. The conversation may be made up of a set of conversation entries. In one example, archiving a set of conversation entries may include posting a conversation entry to a discussion forum thread. To facilitate sharing a conversation, the thread may be accessible to a party other than an original conversation participant.

Method 600 may also include, at 630, archiving conversation metadata. In one example, archiving conversation metadata may include providing an archived conversation to an artificial intelligence logic and then automatically creating a value for a metadata element based on the output of the artificial intelligence logic. In another example, metadata values may be provided by a user. For example, a user may directly enter a value for a topic for a conversation.

Method 600 may also include, at 640, organizing archived conversation entries. The manner in which the conversation entries are archived may depend, at least in part, on the archived conversation metadata. For example, the archived conversation metadata may establish a send/response chain for orders, may establish a time-based order for entries, may identify most responded to entries, and so on. In one example, organizing the archived conversation entries is facilitated by posting conversation entries as elements in a thread in a discussion forum. Thus, navigation logic available in the discussion forum will become available for the conversation elements.

While FIG. 6 illustrates various actions occurring in serial, it is to be appreciated that various actions illustrated in FIG. 6 could occur substantially in parallel. By way of illustration, a first process could manage conversations, a second process could archive conversations and conversation metadata, and a third process could organize archived conversations and/or metadata. While three processes are described, it is to be appreciated that a greater and/or lesser number of processes could be employed and that lightweight processes, regular processes, and other approaches could be employed.

Figure 7:
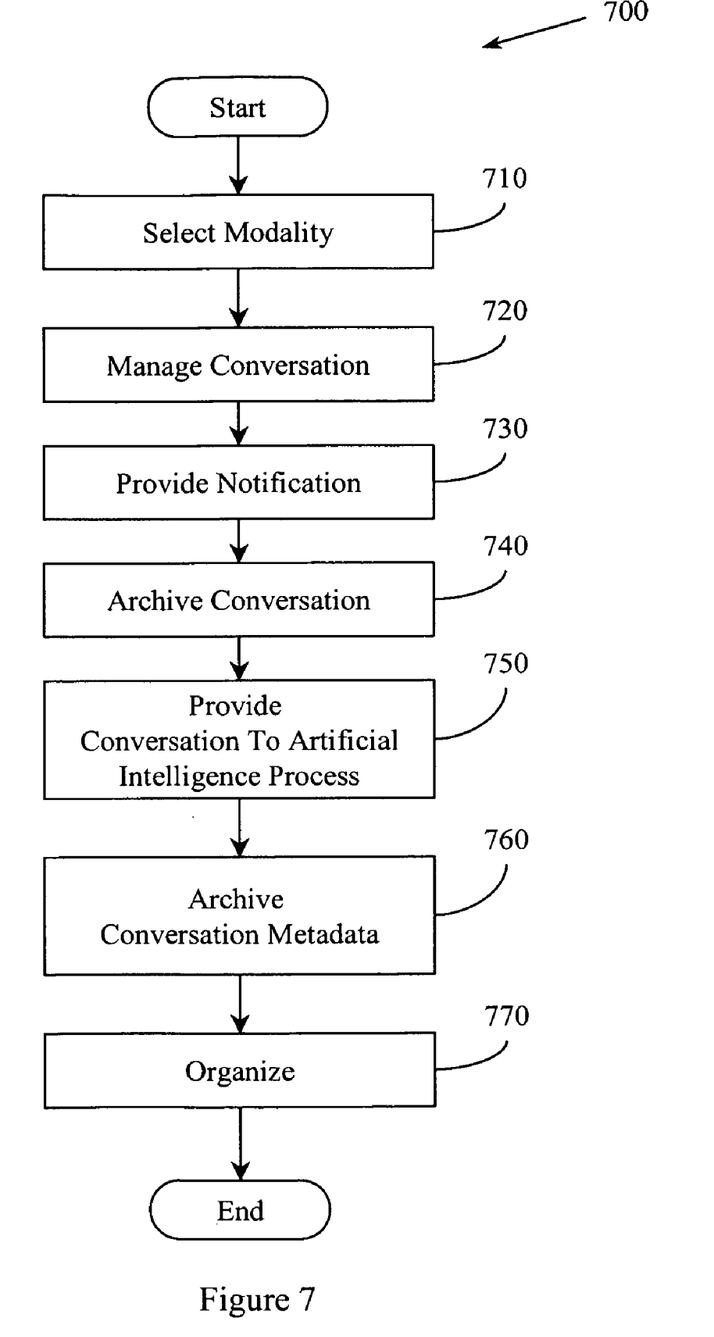
FIG. 7 illustrates an example method associated with thread-based conversation management.

FIG. 7 illustrates a method 700. Method 700 includes some elements similar to those described in connection with method 600 (FIG. 6). For example, method 700 may include, at 720, managing a conversation. Similarly, method 700 may include, at 740, archiving a conversation and, at 760, archiving conversation metadata. Additionally, method 700 may include, at 770, organizing conversation elements. However, method 700 may include additional actions.

For example, method 700 may include, at 710, automatically selecting a communication modality over which a conversation is to proceed. The selection may be based, at least in part, on the online status of a conversation participant(s). In one example, it may be determined that a certain number of members of a conversation are all concurrently online. Thus, the it may be suggested to restart the conversation using an online application. In different examples the suggestion may be sent to the conversation initiator, the original participants, to all participants, and so on. It is to be appreciated that the suggestion may be made to different sets of users. Additionally, the suggestion may be accompanied by a link and/or summary of the conversation.

At certain points in a conversation, notifications concerning the conversation may be sent to participants. For example, when a party to an online conversation decides to go off-line, other participants may be sent a notification. When a party comes back online, other participants may be sent a notification and the returning party may be sent a link to a conversation archive and/or summary. When a third party contributes to a conversation, off-line parties may be notified of the contribution and may be provided with a link to the addition, to a conversation archive, to a conservation re-entry point, and/or to a conversation summary.

Thus, method 700 may also include, at 730, selectively providing a message to a user upon the occurrence of a conversation lifecycle event. The message may include data that facilitates intelligent resuming. For example, the message may include a conversation re-entry point. Additionally, the message may include a conversation overview. The conversation overview may be produced manually by a moderator or, in one example, may be produced in response to providing an archived conversation to an artificial intelligence process (e.g., semantic evaluation logic). The conversation overview may include, for example, a set of conversation entries, a set of questions asked in a conversation, a set of answers related to the set of questions, and so on. As mentioned above, the overview may be the output of an artificial intelligence process that was provided with the archived conversation at 750.

Figure 8:
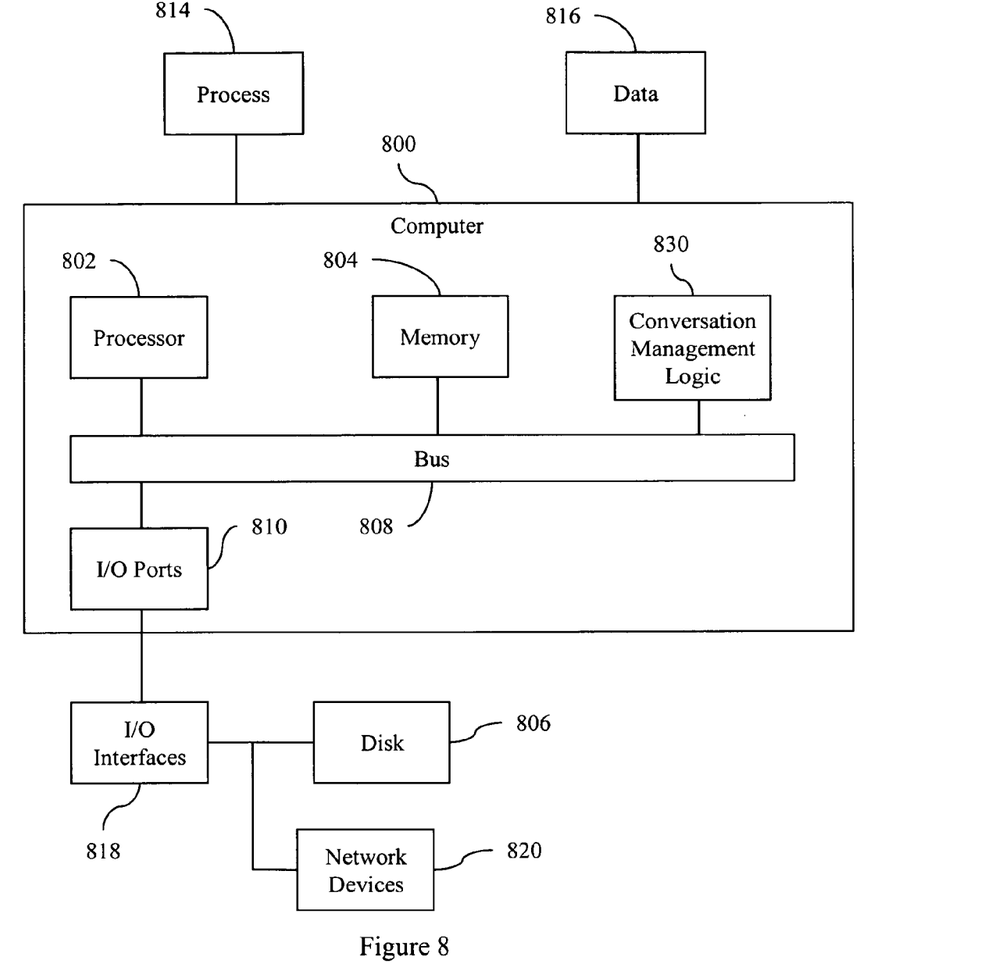
FIG. 8 illustrates an example computing environment in which example systems and methods illustrated herein may operate.

FIG. 8 illustrates an example computing device in which example systems and methods described herein, and equivalents, may operate. The example computing device may be a computer 800 that includes a processor 802, a memory 804, and input/output ports 810 operably connected by a bus 808. In one example, the computer 800 may include a conversation management logic 830 configured to facilitate pausing and resuming a conversation. Conversation management logic 830 may therefore provide means (e.g., hardware, software, firmware) for participating in an electronic conversation carried on, at least in part, using a synchronous online communication application. Conversation management logic 830 may also provide means (e.g., hardware, software, firmware) for archiving the conversation and metadata related to the conversation in a thread-based system. Additionally, conversation management logic 830 may provide means (e.g., hardware, software, firmware) for pausing and resuming the conversation. The pausing and resuming may be based, at least in part, on the archived conversation and metadata related to the archived conversation. While the logic 830 is illustrated as a hardware component attached to the bus 808, it is to be appreciated that in one example, the logic 830 could be implemented in the processor 802.

Generally describing an example configuration of the computer 800, the processor 802 may be a variety of various processors including dual microprocessor and other multiprocessor architectures. A memory 804 may include volatile memory (e.g., RAM) and/or non-volatile memory (e.g., ROM, PROM).

A disk 806 may be operably connected to the computer 800 via, for example, an input/output interface (e.g., card, device) 818 and an input/output port 810. The disk 806 may be, for example, a magnetic disk drive, a solid state disk drive, a floppy disk drive, a tape drive, a Zip drive, a flash memory card, and/or a memory stick. Furthermore, the disk 806 may be a CD-ROM, a CD recordable drive (CD-R drive), a CD rewriteable drive (CD-RW drive), and/or a digital video ROM drive (DVD ROM). The memory 804 can store a process 814 and/or a data 816, for example. The disk 806 and/or the memory 804 can store an operating system that controls and allocates resources of the computer 800.

The bus 808 may be a single internal bus interconnect architecture and/or other bus or mesh architectures. While a single bus is illustrated, it is to be appreciated that the computer 800 may communicate with various devices, logics, and peripherals using other busses (e.g., PCIE, SATA, Infiniband, 1394, USB, Ethernet). The bus 808 can be types including, for example, a memory bus, a memory controller, a peripheral bus, an external bus, a crossbar switch, and/or a local bus.

The computer 800 may interact with input/output devices via the i/o interfaces 818 and the input/output ports 810. Input/output devices may be, for example, a keyboard, a microphone, a pointing and selection device, cameras, video cards, displays, the disk 806, the network devices 820, and so on. The input/output ports 810 may include, for example, serial ports, parallel ports, and USB ports.

The computer 800 can operate in a network environment and thus may be connected to the network devices 820 via the i/o interfaces 818, and/or the i/o ports 810. Through the network devices 820, the computer 800 may interact with a network. Through the network, the computer 800 may be logically connected to remote computers. Networks with which the computer 800 may interact include, but are not limited to, a local area network (LAN), a wide area network (WAN), and other networks.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". The term "and/or" is used in the same manner, meaning "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A system, comprising:
    a conversation manager to provide access to one or more communication applications including a synchronous online real-time communication application, and to provide lifecycle management for a conversation carried on, at least in part, over the synchronous online real-time communication application, the lifecycle management including pausing the conversation and resuming the conversation; and
    a thread manager to organize in thread-based storage one or more conversation elements belonging to the conversation;
    where the conversation manager is configured to resume the conversation with a different communication application than the synchronous online real-time communication application; and
    where the conversation manager includes executable instructions stored on a non-transitory computer readable medium that when executed cause at least a processor to navigate the one or more conversation elements including metadata from the paused conversation to determine a set of participants to include in the resumed conversation which include one or more participants that are different from participants of the paused conversation.

2. The system of claim 1, where the different communication application is an asynchronous communication application.

3. The system of claim 1, where the synchronous online real-time communication application is an instant messaging (IM) application, or a chat application, and where the different communication application is an email application or a discussion forum application.

4. The system of claim 1, the conversation manager comprising:
    a conversation management logic to provide the lifecycle management for the conversation, the lifecycle including conversation initiation and conversation termination;
    a metadata logic to process metadata associated with the conversation; and
    an archive logic to provide a conversation element to the thread manager, to provide conversation metadata to the thread manager, to provide access to a stored conversation element, and to provide access to stored conversation metadata.

5. The system of claim 4, where providing lifecycle management for the conversation includes one or more of, receiving third party submissions, receiving off-line submissions, integrating third party submissions into an archived conversation, and integrating off-line submissions into an archived stored conversation.

6. The system of claim 4, where the metadata associated with the conversation includes one or more of, a topic, a context, a set of questions, and a set of answers.

7. The system of claim 6, where processing the metadata includes one or more of, adding metadata, filtering metadata, deleting metadata, and establishing relations between metadata elements.

8. The system of claim 7, the metadata being acquired automatically from a set of conversation elements.

9. The system of claim 4, the conversation manager including an interface logic to provide an interface to present the conversation as being implemented using a single communication modality.

10. The system of claim 9, the interface logic to automatically provide a suggestion concerning a communication modality for the conversation based, at least in part, on the online status of one or more conversation participants.

11. The system of claim 9, the interface logic to automatically provide a selection concerning a communication modality for the conversation based, at least in part, on the online status of one or more conversation participants.

12. The system of claim 4, the conversation management logic to selectively provide a notification upon an occurrence of a lifecycle event.

13. The system of claim 12, the notification being a link to a one or more of, a conversation, a conversation element, and a conversation summary, a link being one or more of, a URL, a GUID, and a pointer.

14. The system of claim 4, the conversation management logic to resume a conversation using one or more of, an original communication application, and a communication application other than the original communication application, and the conversation management logic to resume a conversation with one or more of, an original set of participants, and a set of participants different than the original set of participants.

15. The system of claim 4, the archive logic to provide access to archived conversation elements and to archived conversation metadata to a party other than an original conversation participant.

16. The system of claim 1, wherein the thread manager is configured to organize the conversation elements in the thread-based storage with a discussion forum configuration.

17. The system of claim 1, further including an artificial intelligence logic to perform semantic analysis on the conversation elements, and
    to generate a conversation summary that includes one or more of, a first conversation element, a last conversation element, a first N conversation elements, N being an integer greater than 1, a last M conversation elements, M being an integer greater than 1, a set of questions, a set of answers related to the set of questions, and a topic extracted from an archived conversation by the artificial intelligence logic.

18. A non-transitory machine-readable medium having stored thereon machine-executable instructions that if executed by a machine cause the machine to perform a method, the method comprising:
    managing, with at least actions from a processor, a conversation having a lifecycle comprising starting, pausing, resuming, terminating, accepting on-line contributions, accepting off-line contributions, and accepting contributions from third parties, the conversation being carried on, at least in part, over a synchronous electronic communication modality;

pausing the conversation via the synchronous electronic communication modality;

archiving, as a thread, the conversation comprising a set of conversation entries;

archiving conversation metadata from the conversation; and organizing the archived conversation entries based, at least in part, on the archived conversation metadata; and resuming the paused conversation over an asynchronous communication modality and preserving a context of the conversation using, at least in part, the archived conversation metadata;

wherein the resuming includes causing at least the processor to search and navigate the archived conversation metadata from the paused conversation to determine, from at least the archived conversation metadata, a set of participants to include in the resumed conversation which include one or more participants that are different from participants of the paused conversation.

19. The machine-readable medium of claim 18, where archiving a set of conversation entries includes posting a conversation entry to a discussion forum thread, the thread being accessible to a party other than an original conversation participant.

20. The machine-readable medium of claim 18, including selectively providing a message to a user upon the occurrence of a conversation lifecycle event.

21. The machine-readable medium of claim 20, the message including a conversation re-entry point.

22. The machine-readable medium of claim 21, the message including a conversation overview comprising one or more of, a set of conversation entries, a set of questions asked in a conversation, a set of answers related to the set of questions, and the output of an artificial intelligence process that was provided with the archived conversation.

23. The machine-readable medium of claim 18, where resuming a conversation includes one or more of, resuming a conversation using an original communication modality, resuming a conversation using a communication modality different from an original communication modality, resuming a conversation using two or more communication modalities, resuming a conversation with an original set of participants, and resuming a conversation with a set of participants different from the original set of participants.

24. The machine-readable medium of claim 18, where managing a conversation includes automatically selecting a communication modality over which a conversation is to proceed based, at least in part, on the online status of one or more conversation participants.

25. The machine-readable medium of claim 18, where archiving conversation metadata includes, providing an archived conversation to an artificial intelligence logic and automatically creating a value for a metadata element based on the output of the artificial intelligence logic.

26. A non-transitory machine-readable medium having stored thereon machine-executable instructions that if executed by a machine cause the machine to perform a method, the method comprising:

providing an interface for participating in an electronic conversation carried on, at least in part, using a synchronous online communication application;

archiving, with at least actions from a processor, elements of the conversation and metadata related to the conversation in a thread-based system;

pausing the conversation from the synchronous online communication application; and resuming the conversation based, at least in part, on the archived elements of the conversation and the metadata related to the archived conversation elements, where the conversation is resumed with an asynchronous communication application;

wherein the resuming includes causing at least the processor to navigate the archived elements including the metadata from the paused conversation to determine from at least the metadata a set of participants to include in the resumed conversation which include participants that are different from participants from the paused conversation.

* * * * *

UNITED STATES PATENT AND TRADEMARK OFFICE
CERTIFICATE OF CORRECTION

| | |
|---|---|
| PATENT NO. | : 8,171,087 B2 |
| APPLICATION NO. | : 11/653597 |
| DATED | : May 1, 2012 |
| INVENTOR(S) | : Carrer et al. |

It is certified that error appears in the above-identified patent and that said Letters Patent is hereby corrected as shown below:

In column 2, line 40, delete "form" and insert -- from --, therefor.

In column 6, line 9-10, delete "servelet," and insert -- servlet, --, therefor.

In column 11, line 31, before "it" delete "the".

Signed and Sealed this
Thirty-first Day of July, 2012

David J. Kappos
*Director of the United States Patent and Trademark Office*